United States Patent
Ochi et al.

[11] Patent Number: 6,076,369
[45] Date of Patent: Jun. 20, 2000

[54] EVAPORATIVE CONCENTRATION APPARATUS FOR WASTE WATER

[75] Inventors: Eiji Ochi; Takeo Shinoda; Atsushi Yoshioka, all of Tokyo; Hideki Kamiyoshi; Atsumasa Endo, both of Kobe, all of Japan

[73] Assignee: Mitsubishi Heavy Industries, Ltd., Tokyo, Japan

[21] Appl. No.: 09/191,636

[22] Filed: Nov. 13, 1998

[30] Foreign Application Priority Data

Jan. 28, 1998 [JP] Japan .................................. 10-015339

[51] Int. Cl.⁷ .................................................. F25B 27/00
[52] U.S. Cl. ........................................................ 62/238.3
[58] Field of Search ............................................ 62/238.3

[56] References Cited

U.S. PATENT DOCUMENTS

| | | | |
|---|---|---|---|
| 3,839,849 | 10/1974 | Maniya | 55/222 |
| 4,307,577 | 12/1981 | Watanabe et al. | 62/238.3 |
| 4,390,396 | 6/1983 | Koblenzer | 202/166 |
| 4,665,711 | 5/1987 | Page | 62/238.3 |
| 4,672,821 | 6/1987 | Furutera et al. | 62/238.3 |
| 4,780,967 | 11/1988 | Mucic | 34/86 |
| 4,953,361 | 9/1990 | Knoche et al. | 62/79 |
| 5,211,816 | 5/1993 | Youngner | 202/205 |
| 5,345,786 | 9/1994 | Yoda et al. | 62/476 |
| 5,953,927 | 9/1999 | Tagamolila et al. | 62/238.3 |

FOREIGN PATENT DOCUMENTS

| | | | |
|---|---|---|---|
| 0820793 A2 | 1/1998 | European Pat. Off. | B01D 1/00 |
| WO 82/01323 | 4/1982 | WIPO | B01D 3/14 |
| WO 86/02714 | 5/1986 | WIPO | F25B 7/00 |
| WO 90/03208 | 4/1990 | WIPO | B01D 7/02 |
| WO 97/20606 | 6/1997 | WIPO | B01D 3/06 |

*Primary Examiner*—Henry Bennett
*Assistant Examiner*—Mark Shulman
*Attorney, Agent, or Firm*—Myers Bigel Sibley & Sajovec

[57] ABSTRACT

The present invention provides an evaporative concentration apparatus for waste water having an evaporating vessel 2 for evaporatively concentrating waste water and a heater 3 for circularly heating an in-vessel liquid in the evaporating vessel 2, in which the whole or part of thermal energy of generated steam 6 discharged from the evaporating vessel 2 is recovered by an absorption heat pump 29, and the thermal energy is supplied to the heater 3. According to the present invention, evaporative concentration can be effected efficiently in the evaporating vessel by effectively utilizing the thermal energy of generated steam, and also the operation of evaporative concentration apparatus can be performed stably by stably securing heating steam quantity.

9 Claims, 2 Drawing Sheets

EVAPORATIVE CONCENTRATION APPARATUS FOR WASTE WATER

FIELD OF THE INVENTION AND RELATED ART STATEMENT

The present invention relates to an evaporative concentration apparatus for waste water and, more particularly, to an evaporative concentration apparatus for waste water in which evaporative concentration of flue gas desulfurization waste water discharged from a flue gas desulfurization plant can be carried out very efficiently and stably, and a small-scale facility and the like are possible.

A conventional evaporative concentration apparatus and a treatment system using the apparatus will be described below with reference to FIG. 2.

Waste water 1 is introduced into an evaporating vessel 2 or into an inlet line of a heater 3 for a concentrated liquid 9, and mixed with an in-vessel liquid. The mixed in-vessel liquid is drawn from the lower part of the evaporating vessel 2 by means of a circulating pump 10 and sent to the heater 3 as the concentrated liquid 9, and a surplus concentrated liquid 12 is sent to a concentrated liquid tank 11. The concentrated liquid 12 sent to the concentrated liquid tank 11 is further treated by a solidifier 14 as a concentrated liquid 12b, and discharged to the outside of the system as a harmless solid matter 15.

Also, generated steam 6 discharged by the evaporation of the in-vessel liquid is sent to a cooler 7.

The concentrated liquid 9 sent to the heater 3 is heated while passing through a heating tube in the heater 3. The heater 3 is a multitubular cylindrical heat exchanger, in which heating steam 4 introduced to a shell of the heater 3 is condensed, by the absorption of latent heat caused by heat exchange, and discharged to the outside of the system as condensate 5 through a steam trap. The concentrated liquid 9 having passed through the heater 3 is allowed to flow back to the evaporating vessel 2, and the evaporative concentration is repeated.

The generated steam 6 generated in the evaporating vessel 2 is sent to the cooler 7, and cooled into condensed water 8 in a shell of the cooler 7. Cooling water (cold) passes through a cooling tube of the cooler 7. After the cooling water (cold) cools the generated steam 6 by heat exchange, the cooling water is discharged to the outside of the cooler as cooling water (warm). Thereafter, the cooling water (warm) is cooled into cold water (cold) again by a cooling tower or the like, and used in a circulating manner. Non-condensable gas generated in the cooler 7 is sucked by a vacuum pump 13 and discharged to the atmosphere. Here, the noncondensible gas means a gas that is not liquefied by cooling.

Desulfurization waste water 1 is saturated with gypsum, so that the temperature of the heating steam 4 must be not higher than 75° C. to prevent scale generation. Therefore, the heating steam 4 must be low-temperature steam.

Also, the generated steam 6 generated form the evaporating vessel 2 condenses in the cooler, and is recovered to a desulfurizer as condensed water 8.

According to the above-described prior art, the waste water in the evaporating vessel 2 is heated by the heat of the heating steam sent from the heater 3. The generated steam 6 heated in the evaporating vessel 2 is condensed by cooling water in the cooler 7 by heat exchange, and the exchanged heat is dissipated to the atmosphere as heat of evaporation in a cooling tower. In other words, most the heat of the heating steam is thrown away to the atmosphere as heat of evaporation in a cooling tower.

Also, the prior art has a drawback in that the quantity of the heating steam sent from the heater 3 is very large.

As a result, the conventional evaporative concentration apparatus has a problem in that the thermal energy supplied to the heater 3 as steam is discharged to the atmosphere, so that new thermal energy is required to send the steam 4 to the heater 3 again.

Also, there arises a problem in that when the heating steam cannot be supplied sufficiently to the heater 3, the evaporative condensing capacity in the evaporating vessel 2 decreases, and the operation of the evaporative concentration apparatus becomes unstable, so that the evaporative concentration ratio of waste water cannot be kept constant.

OBJECT AND SUMMARY OF THE INVENTION

In view of the above problems, the inventors made studies earnestly to develop an evaporative concentration apparatus for desulfurization waste water, in which evaporative concentration can be effected efficiently in an evaporating vessel by effectively utilizing the thermal energy of generated steam, and also the operation of evaporative concentration apparatus can be performed stably by stably securing heating steam quantity.

As a result, the inventors found that such problems could be solved by an evaporative concentration apparatus for waste water having an evaporating vessel and a heater for circular heating, in which the whole or part of thermal energy of generated steam discharged from the evaporating vessel is recovered by an absorption heat pump, and the thermal energy is supplied to the heater.

The present invention was completed from such a viewpoint.

That is to say, the present invention provides an evaporative concentration apparatus for waste water having an evaporating vessel for evaporatively concentrating waste water and a heater for circularly heating an in-vessel liquid in the evaporating vessel, in which the whole or part of thermal energy of generated steam discharged from the evaporating vessel is recovered by an absorption heat pump, and the thermal energy is supplied to the heater.

Here, it is preferable that the absorption heat pump use water ($H_2O$) as a refrigerant and lithium bromide (LiBr) solution as an absorbent (absorbing liquid), and include an evaporator for evaporating a refrigerant by the thermal energy from the generated steam, an absorber for absorbing the refrigerant steam in the absorbent, and a regenerator for making the absorbent concentrated by evaporating the refrigerant from the absorbent by using a driving heat source so as to be made reusable in the absorber. Also, the absorption heat pump may be provided with a condenser for heating circulating warm water again by using the refrigerant steam generated in the regenerator.

Preferably, the driving heat source should be steam, or fuel combustion direct fire or combustion gas, and the pressure in the evaporating vessel should be lower than the atmospheric pressure. The evaporative concentration apparatus in accordance with the present invention is most effective in the case where the waste water evaporatively concentrated by the evaporating vessel is wet type desulfurization waste water when sulfur oxides in combustion exhaust gas of coal or oil are removed.

According to the evaporative concentration apparatus in accordance with the present invention, the heating steam quantity necessary for evaporative concentration of waste water can be decreased significantly as compared with the conventional apparatus. Also, the capacity of cooler and cooling tower facility necessary for condensation of generated steam from the evaporating vessel can be reduced significantly as compared with the conventional apparatus.

Further, according to the apparatus of the present invention, the condensate of steam of driving heat source is clean without being polluted, so that it can be sent back to a steam generating plant for reuse.

Figure 1:
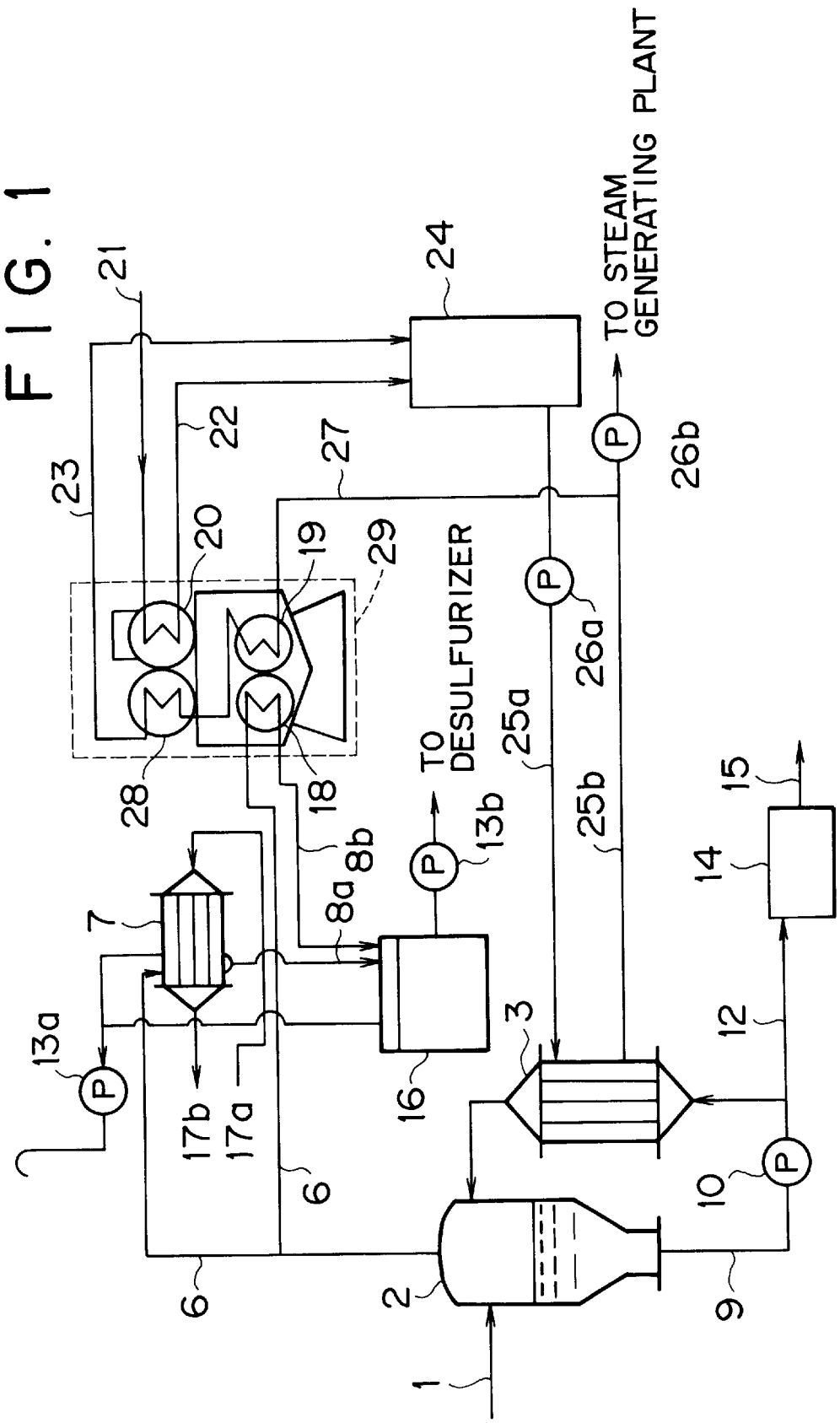
FIG. 1 is an arrangement view showing one embodiment of an evaporative concentration apparatus for waste water in accordance with the present invention.

In the drawings, reference numeral 1 denotes desulfurization waste water, 2 denotes an evaporating vessel, 3 denotes a heater, 4 denotes steam, 5 denotes condensate, 6 denotes generated steam, 7 denotes a cooler, 8a and 8b denote condensed water, 9 denotes concentrated liquid, 10 denotes a circulating pump, 11 denotes a concentrated liquid tank, 12 and 12b denote concentrated liquid, 13a denotes a vacuum pump, 13b denotes a pump, 14 denotes a solidifier, 15 denotes a solid matter, 16 denotes a condensed water tank, 17a denotes cooling water (cold), 17b denotes cooling water (warm), 18 denotes an evaporator, 19 denotes an absorber, 20 denotes a regenerator, 21 denotes plant steam, 22 denotes condensate, 23 denotes heated water, 24 denotes a circulating water tank, 25a and 25b denote circulating warm water, 26a and 26b denote pumps, 27 denotes circulating warm water, 28 denotes a condenser, and 29 denotes an absorption heat pump.

DETAILED DESCRIPTION OF PREFERRED EMBODIMENTS

An evaporative concentration apparatus in accordance with the present invention and a treatment system using the concentration apparatus will be described below with reference to FIG. 1.

Figure 2:
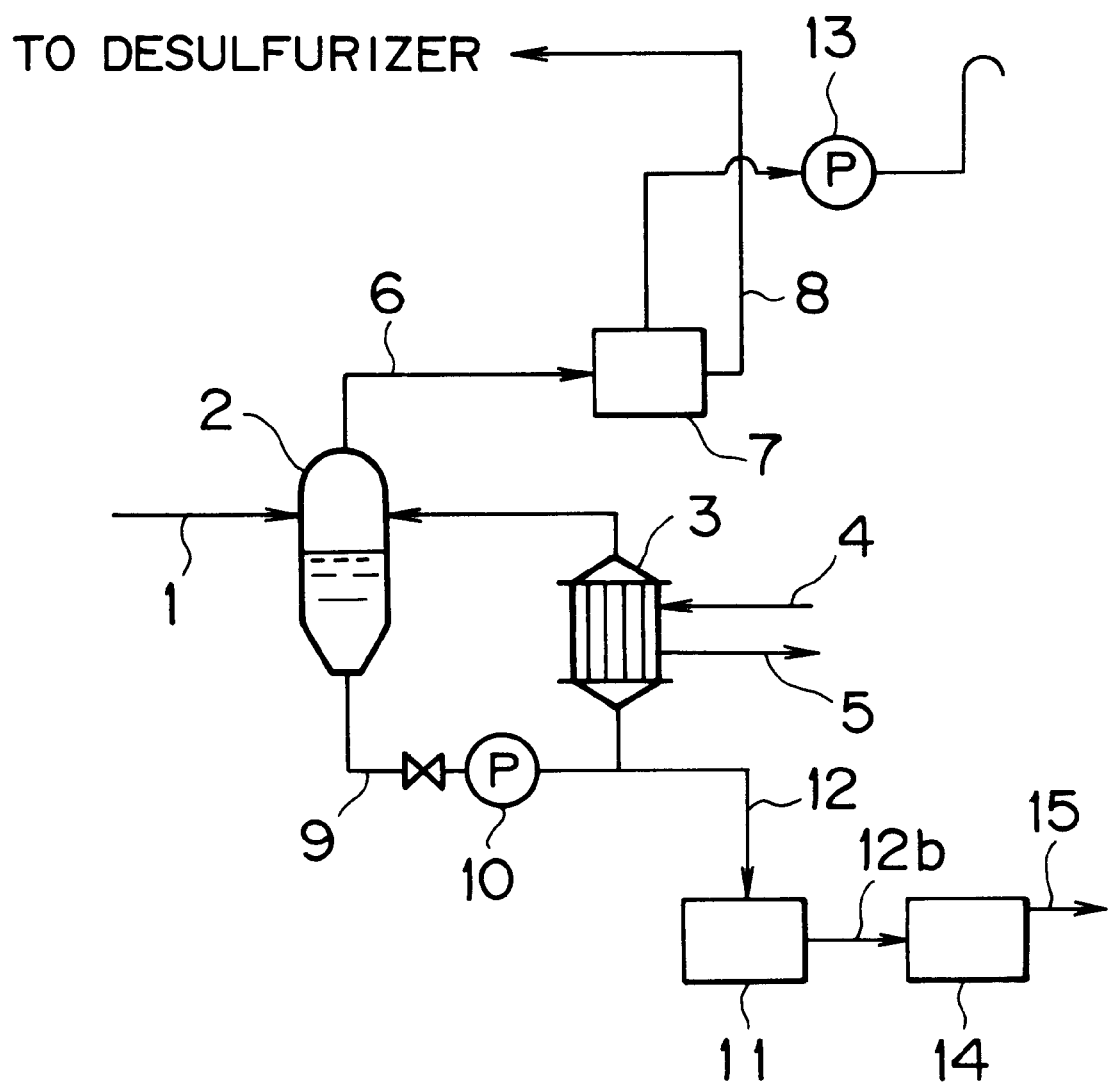
FIG. 2 is an arrangement view of a conventional evaporative concentration apparatus for waste water.

In the evaporative concentration apparatus shown in FIG. 1, unlike the conventional apparatus shown in FIG. 2, the whole or part of thermal energy of generated steam discharged from an evaporating vessel is recovered by an absorption heat pump, and the thermal energy is supplied to a heater.

In this embodiment, as explained in FIG. 2 regarding the prior art, waste water 1 is introduced into an evaporating vessel 2 and mixed with an in-vessel liquid. The mixed in-vessel liquid is heated by a circulating liquid sent from a heater 3, and part of water is evaporated and concentrated.

The concentrated in-vessel liquid is drawn from the lower part of the evaporating vessel 2 by means of a circulating pump 10, and sent to the heater 3 as a concentrated liquid 9. A surplus concentrated liquid 12 is discharged to the outside of the system, and treated into a harmless solid matter by a solidifier 14 or the like. The whole or part of generated steam 6 discharged by the evaporation of in-vessel liquid is sent to an absorption heat pump 29, and other part thereof is sent to a cooler 7.

The concentrated liquid 9 sent to the heater 3 is heated by heat exchange while passing through a heating tube of the heater 3. In the heater 3, for which a multitubular cylindrical heat exchanger is usually used, circulating warm water (warm) 25a introduced to a shell of the heater 3 is cooled by the absorption of latent heat caused by heat exchange, turning to circulating warm water (cold) 25b. Most of the circulating warm water (cold) 25b is sent to the absorption heat pump 29, and other part thereof is sent to a steam generating plant.

After the concentrated liquid 9 having passed through the heater 3 is allowed to flow back to the evaporating vessel, the evaporative concentration is repeated. Here, the circulating warm water 25a supplied to the heater 3 should preferably be warm water having a saturation temperature of 70 to 80° C.

In the above treatment process, the operating conditions in the evaporating vessel 2 are set as follows: Evaporation temperature Normally 45 to 90° C.

Preferably 50 to 70° C.

Evaporated steam pressure

Normally 70 to 530 Torr

Preferably 90 to 190 Torr

For example, if the evaporation temperature is lower than 45° C., the interior of the evaporating vessel 2 must be made high vacuum, so that there arises a problem in that a high-performance vacuum pump is needed, which is uneconomical. If it exceeds 90° C., there is a drawback in that gypsum scale increases, and the calorie for heating during the evaporative concentration increases.

In the present invention, the whole or part of the generated steam 6 generated in the evaporating vessel 2 is sent to the absorption heat pump 29.

The absorption heat pump 29, which usually uses water as a refrigerant and lithium bromide solution as an absorbent, includes a refrigerant evaporator 18 for evaporating a refrigerant by the thermal energy from the generated steam 6, an absorber 19 for absorbing refrigerant steam in the absorbent, and regenerator 20 for making the absorbent concentrated by evaporating the refrigerant from the absorbent so as to be made reusable in the absorber. Also, it is preferable that the absorption heat pump 29 be provided with a condenser 28 for heating circulating warm water 27 again by the refrigerant steam generated in the regenerator.

In FIG. 1, The whole or part of the generated steam 6 is introduced to the evaporator 18 in the absorption heat pump 29. In the evaporator 18, water is heated by the generated steam 6, refrigerant steam at a low temperature is generated, and the refrigerant steam is supplied to the absorber 19. By this heat exchange caused by the movement of the refrigerant steam in the absorption heat pump 29, the introduced generated steam 6 dissipates thermal energy for the refrigerant evaporation and is condensed in the evaporator 18, and then is discharged from the evaporator 18 as a condensed liquid 8b.

The aforesaid absorber 19 is supplied with low-pressure refrigerant steam generated in the evaporator 18 and a concentrated absorbent from the regenerator 20. In this absorber 19, the concentrated absorbent of lithium bromide absorbs the low-pressure refrigerant steam and turns to a dilute solution, and the absorption heat is discharged. That is, the refrigerant steam is absorbed in a concentrated absorbent with high lithium bromide concentrations while holding steam enthalpy.

The aforesaid dilute solution with low lithium bromide concentrations is sent to the regenerator 20, and heated by plant steam 21 in the regenerator 20. By this heating, the refrigerant steam (water vapor) in the dilute solution is evaporated, and supplied to the condenser 28. Also, the dilute solution is concentrated into a concentrated absorbent with high lithium bromide concentrations. This concentrated absorbent is supplied again to the absorber 19.

The circulating warm water 27 is introduced into the absorber 19 and heated by the absorption heat, and further is introduced into the condenser 28, where it is heated again by the refrigerant steam. Then, the circulating warm water 27 is discharged from the condenser 28 as high-temperature heated water 23.

The thermal energy given to the heated water 23 usually reaches about 1.7 times the calorie of the plant steam 21, and the temperature thereof usually reaches 70 to 90° C. depending on the quantity and temperature of the heated water 23.

Here, the refrigerant steam (water vapor) having heated the circulating warm water 27 in the condenser 28 is condensed into water, and supplied to the evaporator 18 as necessary. Also, the dilute solution having absorbed the low-pressure refrigerant steam in the absorber 19 is supplied to the regenerator 20.

Thus, the heated water 23 heated two times in the absorption heat pump is sent to a circulating water tank 24, and combined with condensate 22 of the plant steam 21 in the tank 24.

The warm water in the circulating water tank 24 is sent to the heater 3 as the circulating warm water (warm) 25*a* by a pump 26*a*. The circulating warm water 25*a* introduced into the heater 3 is cooled by the absorption of latent heat caused by heat exchange, and flows out as the circulating warm water (cold) 25*b*. Part thereof is sent to the absorption heat pump 29 as the circulating warm water 27, and other part is sent to the steam generating plant.

On the other hand, other part of the generated steam 6 generated in the evaporating vessel 2 is sent to the cooler 7, and cooled into condensed water 8*a* in the shell of the cooler 7. In a cooling tube of the cooler 7, usually cooling water (cold) flows through, cools the generated steam 6 by heat exchange, and then is discharged to the outside of the apparatus as cooling water (warm) 17*b*. Thereafter, the cooling water (warm) 17*b* is cooled into the cooling water (cold) again by a cooling tower or the like, by which it is used for circulation.

The noncondensible gas generated in the cooler 7 is sucked by a vacuum pump 13*a*, and discharged to the atmosphere. Here, the noncondensible gas means a gas that is not liquefied by cooling.

The condensed water 8*a* sent from the cooler 7 is introduced into a condensed water tank 16 together with the condensed water 8*b* sent from the absorption heat pump 29. In this condensed water tank 16 as well, the generated noncondensible gas is sucked by the vacuum pump 13*a* and discharged to the atmosphere. The condensed water in the condensed water tank 16 is sent to a desulfurizer by means of a pump 13*b*.

The evaporative concentration apparatus for waste water in accordance with the present invention is not limited to the above embodiment, and can be modified variously in the scope of the technical concept of the present invention.

In the evaporative concentration apparatus for waste water in accordance with the present invention, evaporative concentration can be effected efficiently in an evaporating vessel by effectively utilizing the thermal energy of generated steam, and also the operation of evaporative concentration apparatus can be performed stably by stably securing heating steam quantity.

That is, according to the present invention, the thermal energy obtained from generated steam is taken out to heat circulating warm water, by which heating steam used for a heater can be supplied efficiently in large quantities. Thereupon, new heating steam quantity necessary for evaporative concentration of waste water can be decreased significantly (about 40 to 50%) as compared with the conventional apparatus. Also, the evaporative concentration apparatus can be operated stably, and the evaporative concentration ratio of waste water can be kept constant. Further, the capacity of cooler and cooling tower facility necessary for condensation of generated steam from an evaporating vessel can be reduced significantly (about 40 to 50%) as compared with the conventional apparatus.

Further, according to the apparatus of the present invention, the condensate of steam of driving heat source is clean without being polluted, so that it can be sent back to a steam generating plant for reuse.

What is claimed is:

1. An evaporative concentration apparatus for waste water having an evaporating vessel for evaporatively concentrating waste water and a heater for circularly heating an in-vessel liquid in said evaporating vessel, in which the whole or part of thermal energy of generated steam discharged from said evaporating vessel is recovered by an absorption heat pump, and said thermal energy is supplied to said heater.

2. An evaporative concentration apparatus for waste water according to claim 1, wherein said absorption heat pump, which uses water as a refrigerant and lithium bromide solution as an absorbent, includes an evaporator for evaporating a refrigerant by the thermal energy from said generated steam, an absorber for absorbing said refrigerant steam in the absorbent, and a regenerator for making the absorbent concentrated by evaporating the refrigerant from said absorbent by using a driving heat source so as to be made reusable in said absorber.

3. An evaporative concentration apparatus for waste water according to claim 1, wherein said driving heat source is steam, fuel combustion direct fire or fuel combustion gas.

4. An evaporative concentration apparatus for waste water according to claim 1, wherein said driving heat source is steam, and the thermal energy of condensed water obtained by condensing said steam by using said absorption heat pump is supplied to said heater.

5. An evaporative concentration apparatus for waste water according to claim 1, wherein the pressure in said evaporating vessel is lower than the atmospheric pressure.

6. An evaporative concentration apparatus for waste water according to claim 1, wherein the waste water evaporatively concentrated by said evaporating vessel is wet type desulfurization waste water when sulfur oxides in combustion exhaust gas of coal or oil are removed.

7. An evaporative concentration apparatus for waste water according to claim 3, wherein the waste water evaporatively concentrated by said evaporating vessel is wet type desulfurization waste water when sulfur oxides in combustion exhaust gas of coal or oil are removed.

8. An evaporative concentration apparatus for waste water according to claim 4, wherein the waste water evaporatively concentrated by said evaporating vessel is wet type desulfurization waste water when sulfur oxides in combustion exhaust gas of coal or oil are removed.

9. An evaporative concentration apparatus for waste water according to claim 5, wherein the waste water evaporatively concentrated by said evaporating vessel is wet type desulfurization waste water when sulfur oxides in combustion exhaust gas of oil are removed.

\* \* \* \* \*

UNITED STATES PATENT AND TRADEMARK OFFICE
CERTIFICATE OF CORRECTION

PATENT NO.   : 6,076,369
DATED        : June 20, 2000
INVENTOR(S)  : Ochi et al.

It is certified that error appears in the above-identified patent and that said Letters Patent is hereby corrected as shown below:

Column 6, claim 9,
Line 65, "of oil" should read -- of coal or oil --.

Signed and Sealed this

Twenty-seventh Day of November, 2001

Attest:

*Attesting Officer*

NICHOLAS P. GODICI
*Acting Director of the United States Patent and Trademark Office*